(12) United States Patent
Bearden et al.

(10) Patent No.: US 6,871,233 B1
(45) Date of Patent: Mar. 22, 2005

(54) METHOD AND APPARATUS FOR USE IN SPECIFYING AND INSURING SERVICE-LEVEL QUALITY OF SERVICE IN COMPUTER NETWORKS

(75) Inventors: Mark Joseph Bearden, Woodstock, GA (US); Sachin Garg, Green Brook, NJ (US); Woei-Jyh Lee, Burtonville, MD (US); Aad Petrus-Antonius van Moorsel, Berlin (DE)

(73) Assignee: Lucent Technologies Inc., Murray Hill, NJ (US)

( * ) Notice: Subject to any disclaimer, the term of this patent is extended or adjusted under 35 U.S.C. 154(b) by 469 days.

(21) Appl. No.: 09/610,630

(22) Filed: Jul. 5, 2000

(51) Int. Cl.[7] ............................................. G06F 15/173
(52) U.S. Cl. ..................... 709/226; 709/224; 709/227; 709/223
(58) Field of Search .............................. 709/224, 226, 709/227, 223, 225, 228, 232, 233, 250

(56) References Cited

U.S. PATENT DOCUMENTS

| | | | |
|---|---|---|---|
| 5,475,838 A | | 12/1995 | Fehskens et al. |
| 5,539,659 A | * | 7/1996 | McKee et al. ............... 709/224 |
| 5,717,747 A | | 2/1998 | Boyle, III et al. |
| 5,872,928 A | | 2/1999 | Lewis et al. |
| 5,898,668 A | * | 4/1999 | Shaffer ........................ 370/230 |
| 5,909,550 A | | 6/1999 | Shankar et al. |
| 6,047,322 A | * | 4/2000 | Vaid et al. ................... 709/224 |

(List continued on next page.)

OTHER PUBLICATIONS

Joel Conover, "Policy-Based Network Management" http://www.networkcomputing.com/shared/printArticle?articles=nc/1024/1024fl.html?pub=nwc, Nov. 1999.

(List continued on next page.)

*Primary Examiner*—Ayaz Sheikh
*Assistant Examiner*—Christian La Forgia

(57) ABSTRACT

The "what" and "how" of policy-based management is integrated in a single framework that enables a system administrator to specify service-level quality of service (QoS) goals for automatic enforcement. Automatic enforcement of the specified "high-level" QoS goals is realized through the execution of "low-level" rule-based or procedural logic, without the client having to specify the low level logic. Specifically, one embodiment of the invention employs a management server including a graphical interface that allows a user, e.g. a system administrator, to easily specify parameters for service-level QoS goals. A QoS goal is defined by the administrator selecting a client, a service and a QoS expression that specifies the desired service-level QoS. The state of the network is monitored and one or more defined QoS goals are selected for evaluation in a continuous process. The QoS delivered for the selected goal is determined and compared to the desired QoS for the selected QoS goal. Then, prescribed actions are taken or not depending whether the delivered QoS is equal to the selected QoS goal. If not, and the delivered QoS exceeds the selected QoS goal, a set of actions is determined and executed to reduce network resources assigned to the client and service of the selected goal. Similarly, if the delivered QoS is worse than the selected QoS goal, a set of actions is determined and executed to increase network resources assigned to the client and service of the selected goal.

36 Claims, 3 Drawing Sheets

U.S. PATENT DOCUMENTS

| | | | | | |
|---|---|---|---|---|---|
| 6,091,709 | A | * | 7/2000 | Harrison et al. | 370/235 |
| 6,104,700 | A | * | 8/2000 | Haddock et al. | 370/235 |
| 6,119,235 | A | * | 9/2000 | Vaid et al. | 713/201 |
| 6,167,445 | A | * | 12/2000 | Gai et al. | 709/223 |
| 6,212,562 | B1 | * | 4/2001 | Huang | 709/227 |
| 6,449,650 | B1 | * | 9/2002 | Westfall et al. | 709/228 |
| 6,463,470 | B1 | * | 10/2002 | Mohaban et al. | 709/223 |
| 6,466,984 | B1 | * | 10/2002 | Naveh et al. | 709/228 |
| 6,539,425 | B1 | * | 3/2003 | Stevens et al. | 709/220 |
| 6,587,876 | B1 | * | 7/2003 | Mahon et al. | 709/223 |
| 6,594,277 | B1 | * | 7/2003 | Chiang et al. | 370/465 |
| 6,611,864 | B2 | * | 8/2003 | Putzolu et al. | 709/223 |
| 6,671,724 | B1 | * | 12/2003 | Pandya et al. | 709/226 |
| 6,690,649 | B1 | * | 2/2004 | Shimada | 370/238 |

OTHER PUBLICATIONS

R. Bhatia, et al., "A Policy–based Network Management System", Proceedins International Conference on Parallel and Distributed Techniques and Applications, Las Vegas, Nevada, Jun. 1999, 7 pages.

Mark A. Carlson, Create automated and distributed management applications with Jiro technology, Part 1, http://www.–avaworld.com/javaworld/jw–02–2000/jw–02–jiro p.html, Feb. 2000, 8 pages.

L. Lewis, "On the Integration of Service Level Management and Policy–Based Control", *In Proceedings, Policy Workshop 1999*, HP–laboratories, Bristol, U.K. Nov. 1999, 3 pages http://www–dse.doc.ic.ac.uk/events/policy–99/pdf/14b–Lewis.pdf.

D. Verma et al., "Service Level Agreements and Policies", *In Proceedings, Policy Workshop 1999*, HP–Laboratories, Bristol, U.K., Nov. 1999, 7 pages. http://www–dse.doc.ic.ac.uk/events/policy–99/pdf/12–wijnen.pdf.

M. Casassa Mont et al., "Power Ptototype: Towards Integrated Policy–Based Management", http://www.hpl.hp.com/techreports/1999/HPL–1999–126.html, Oct. 18, 1999, pp. (a) & 1–14.

* cited by examiner

FIG. 1
TABLE 1

| GOAL | GOAL PARAMETERS |
|---|---|
| DURING "T", SATISFY "Q" FOR CLIENT "C" USING SERVICE "S" | C: Client ε {client1, client2, ...}<br>S: Service ε {Web, DNS, Fileserver, ERP, ...}<br>Q: QoS Expression<br>  Q.metric: QoS Metric ε {TransactionResponseTime, TransactionFailRate, ...}<br>  Q.op: Operator ε {=, ≤, ≥, ...}<br>  Q.value: Desired QoS Value ε {Float, Integer, Enumeration, ...}<br>T: TimeRange |

FIG. 2
TABLE 2

| PROCEDURAL POLICY LOGIC |
|---|
| 1. if (¬satisfied ( getClientQoS( C, Q.metric), Q.op, Q.value ) ) |
| 2. then |
| 3.   set priority[C][S] = priority[C][S]++   // Make appropriate priorty addjustment, i.e. increase. |
| 4.   enforce the following "if condition then action" rule at each network element E that switches packets sent to/from C: |
| 5.     if (packet P has arrived at E) && (timeOfDay is in T) && |
| 6.       ( {{{ P.destIPport == S.serviceIPport ) && ( P.srcIPsubnet == C.subnetMask }}} || |
| 7.         {{{ P.srcIPport == S.serviceIPport ) && ( P.destIPsubnet == C.subnetMask }}} ) |
| 8.     then |
| 9.       set P.priority = priority[C][S] |
| 10.    endif |
| 11. Endif |

METHOD AND APPARATUS FOR USE IN SPECIFYING AND INSURING SERVICE-LEVEL QUALITY OF SERVICE IN COMPUTER NETWORKS

RELATED APPLICATION

United States patent application Ser. No. 09/610,631 was filed concurrently herewith.

TECHNICAL FIELD

This invention relates to computer networks and, more particularly, to monitoring and controlling quality of service (QoS) in such computer networks.

BACKGROUND OF THE INVENTION

Known policy-based computer network management arrangements do not clearly distinguish the goal, i.e. the "what", of management from the policy, i.e. the "how", that achieves the goal. Indeed, most known policy-based management (PBM) arrangements require a system administrator to specify policies as declarative rules of the form "if event/condition then action." From a system administrator's viewpoint, such rules represent a "high-level" specification of "what" needs to be achieved in terms of the network/system behavior. However, from the viewpoint of a client, i.e. the end user of a service, such rules represent a "low-level" specification of "how" the client's desired system behavior is to be achieved. This makes it difficult or impossible for clients without expertise in network management to express the desired system behavior in a way supported by known PBM arrangements. Instead, a system administrator typically translates the client's "high-level" description of the desired system behavior, i.e. service-level QoS goals, into "low-level" rule-based or procedural syntax of network management policies. To summarize, in the known PBM arrangements, there is no support for specifying the client's service-level QoS goals as part of the network management policy definition.

SUMMARY OF THE INVENTION

Problems and/or limitations of prior policy-based network management arrangements are addressed by integrating the "what" and "how" of PBM in a single framework that enables a system administrator to specify service-level QoS goals for automatic enforcement instead of, or in addition to, policy rules or procedures. Automatic enforcement of the specified QoS goals is realized through the execution of policy logic, i.e. policy rules or procedures, without the client or system administrator having to specify the policy logic in the form of rules and/or procedures.

Specifically, one embodiment of the invention employs a management server including a graphical interface that allows a user, e.g. an administrator, to easily specify parameters for predefined types of service-level QoS goals. A QoS goal is defined by specifying a client, a service, and a QoS expression. A QoS expression is a proposition that indicates the client's desired range of values for some QoS metric, e.g. service response time or service availability. The state of the network is monitored and one or more defined QoS goals are selected for evaluation in a continuous process. The QoS delivered for the selected goal is determined and compared to the selected QoS goal. Then, prescribed actions are taken or not depending whether the delivered QoS is equal to the selected QoS goal. If not, and the delivered QoS exceeds the selected QoS goal, a set of actions is determined and executed to reduce network resources, i.e. network element resources, assigned to the client and service of the selected goal. Similarly, if the delivered QoS is worse than the selected QoS goal, a set of actions is determined and executed to increase network resources assigned to the client and service of the selected goal.

In an embodiment of the invention, QoS goals are stored in a goal repository and continuously updated by adding, redefining, or removing a service-level QoS goal as requested by an administrator.

Similarly, in an embodiment of the invention, the state of the network is monitored and the results are stored in a monitored state repository. Also stored in the monitored state repository are state changes indicated by received network event notifications.

BRIEF DESCRIPTION OF THE DRAWING

FIG. 1 is a table illustrating in simplified and generalized form example "high-level" QoS management goals;

FIG. 2 is a table illustrating in simplified form an example policy procedural logic;

DETAILED DESCRIPTION

Figure 3:
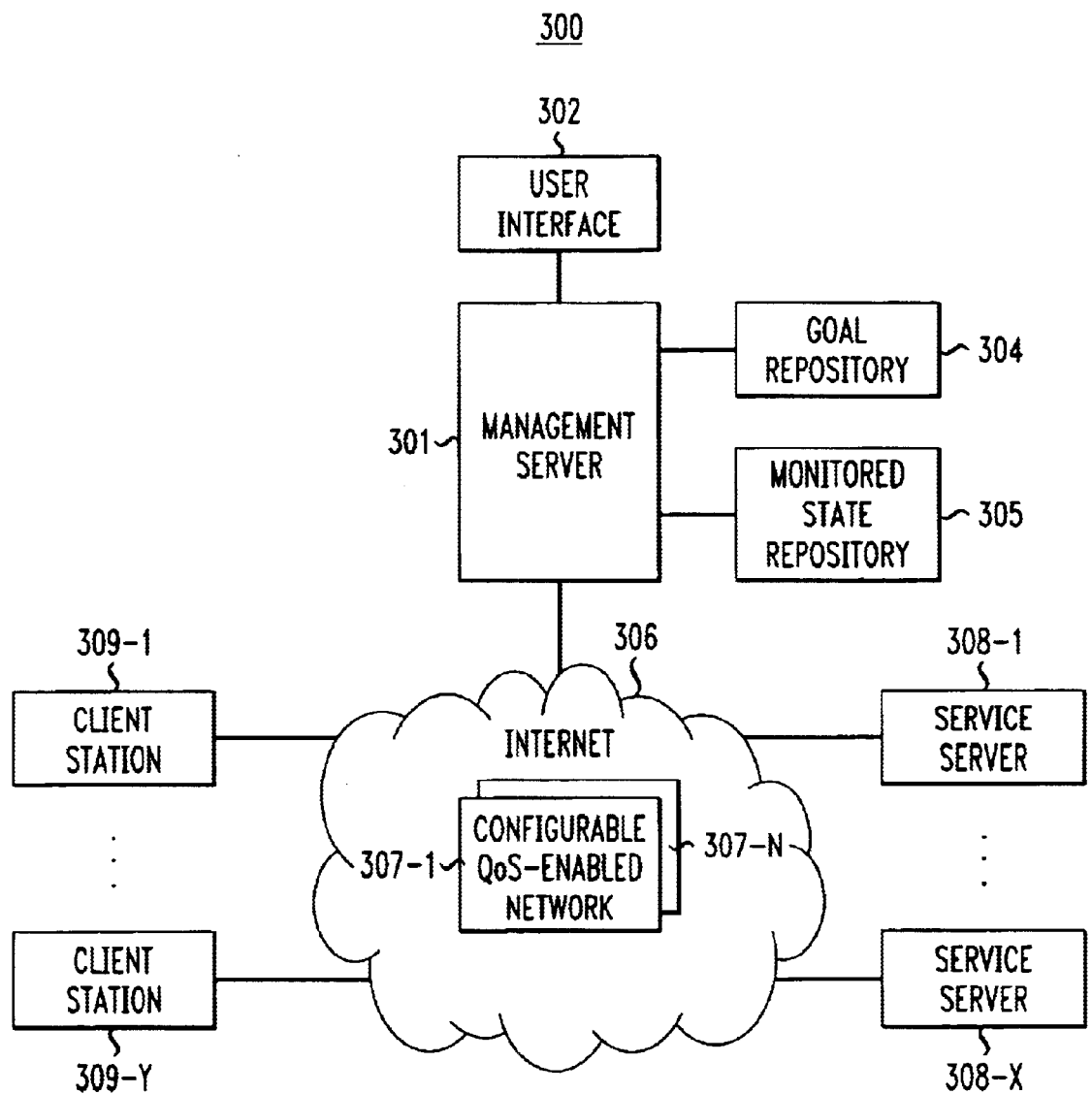
FIG. 3 shows, in simplified form, details of a network employing an embodiment of the invention.

Again, it is noted that current PBM arrangements require system administrators to specify rules that to the system administrator represent the specification of "what" needs to be achieved in terms of network/system behavior. From a client viewpoint, however, these rules represent the "how" of management. The client is really interested in service-level QoS goals such as "my transaction failure rate should be less than some specific value" or "my end-to-end response should be less than some specific value". Indeed, there is currently no support in prior arrangements for specifying the client's service-level QoS goals as part of the management policy definition.

FIG. 1 is a table illustrating in simplified form example QoS goals. As shown, QoS goals are represented using the generalized goal template shown in TABLE 1, namely, "during T, satisfy Q for client C that uses service S". The goal parameters, in this example, are defined as follows. Parameters C and S identify respectively a client and some service accessed by the client, such as a Web or DNS server, a networked application server, or a file server. Parameter Q is a QoS expression with three parts, as follows. The first part is Q.metric that identifies a QoS metric such as end-to-end service delay, transaction failure rate, etc.; the second part is Q.op, an operator used to compute whether the client's delivered QoS value satisfies the desired QoS; the third part is Q.value, a value that represents the desired QoS for the given QoS metric. The QoS expression will evaluate to "true" or "false" at run time when the given operator Q.op is used to compare the delivered QoS for the given metric to the desired QoS, Q.value. Finally, parameter T identifies a time range when the given QoS goal is intended to have effect. By way of an example, consider an end-to-end QoS goal as follows: "Provide client Joe with average SAP transaction delay of at most 1 second," where SAP is an example networked service. This QoS goal is represented by setting the parameters of TABLE 1 as follows: C="Joe", S="SAP", Q.metric="AvgSAPTransactResponse", Q.op=

"≦", Q.value="1 second", and T="Always". The goal is satisfied when client Joe's average SAP transaction response time is determined, through observation and/or estimation, to be less than or equal to one second. The goal is not satisfied whenever Joe's SAP average transaction response time is determined to be greater than one second.

FIG. 2 is a table illustrating in simplified form an example policy procedural logic. Specifically, shown in TABLE 2 is pseudocode for one possible (simplistic) procedure for enforcing the above QoS goal in a networked system with priority-based packet switching and a function defined as getClientQoS( ) that measures or computes a client's transaction delay. The example pseudocode is explained as follows. The "if" condition in line 1 is satisfied when the delivered QoS for client C using service S does not satisfy the QoS expression of the goal specified for client C and service S. Line 3 specifies an example action that is expected to help the delivered QoS for client C to achieve the value specified in the goal. Specifically, in this example the priority for network traffic is increased, for traffic generated by client C accessing service S. Lines 5 through 10 specify a rule of the form "if condition then action" similar to those commonly supported by existing PBM arrangements and by existing QoS-enabled network devices. In lines 5 through 7, the condition part of the rule identifies that a given packet P is part of client C's communication with service S. Line 9 contains the action part of the rule, which in the given example is setting the appropriate priority for switching and queuing the packet at network elements. Line 4 indicates that this policy rule should be enforced at each element in the network over which client C accesses service S.

It is noted that such a procedure can be specified by a management expert in advance and reused for a number of different goal parameters, i.e. for different clients, services, QoS metrics, etc. Indeed, the procedural policy specification is highly dependent on the types of parameters assigned to the QoS goal template, and on the types of elements in the networked system that can be controlled in order to enforce QoS.

It is felt best to consider some terminology. Thus, a "policy" is defined to be a process that implements a function with a parameter called an "objective." An "objective" is defined to be a Boolean expression over some set of goals. A goal is a proposition defined as above on (1) a "service", i.e. an application, (2) a "client" that accesses the service, (3) a "time range" for goal enforcement, and (4) a "QoS "expression" specified using applicable metric identifiers, operators, and values. Again, an example goal proposition is as follows: Client=Joe, Service=SAP, Time= Always and TransactionDelay≦1 ms. A "policy instance" P(H) exists whenever objective H is enforced using policy P. The inputs to a policy instance are state updates of the client, service, and network elements that allow the client to access the service, and its outputs are a combination of (1) policy rules consumed by rule-based PBM software, (2) control signals sent to network elements and resources to affect the client's QoS, and/or (3) notifications sent to a administrative interface, including but not limited to service-level alarms and suggested manual network provisioning actions.

An embodiment of the invention allows the user (system administrator) to specify a set of goals and objectives in a goal repository, describing the "what" of the service-level QoS management. For each goal G in some objective H specified, a policy is automatically selected such that the effect of executing P(G) is to enforce goal G to the extent that is feasible given the available networked resources. Thus, the invention accepts only a limited set of goals for which the embodiment of the invention contains the policy logic needed to enforce those goals. The "how" of enforcing the goals is specified by the policy logic contained in the invention's embodiment. As noted earlier, a simplified example of policy logic is given in TABLE 2 of FIG. 2.

In this embodiment of the invention there is an explicit distinction between the "what" and "how" of PBM and each one is an integral part of a policy framework and a PBM solution which enables the following:

Directly specifying (and modifying on-line) clients' service-level QoS goals as part of the network management objective;

Easily reporting and verifying the effectiveness of policy-based management for achieving these goals;

Providing feedback so that policy logic can be modified, either manually offline or automatically on-line to achieve desired QoS goals;

Enabling service providers and clients to establish service-level agreements (SLA's) based on goals and objectives that are mutually understood. As an integral part of the policy specification, such SLA's enable an SLA-based revenue model for service providers, as opposed to the flat-rate pricing that is presently the norm for service providers.

FIG. 3 shows, in simplified form, details of network 300 employing an embodiment of the invention. Specifically, shown are management sever 301 including an embodiment of the invention, an associated graphical user interface 302, goal repository 304, and monitored state repository 305. Management server 301 is controllably connected to a data communication network 306, for example, the internet or World Wide Web (the Web), that includes a set of one or more configurable QoS-enabled network elements 307-1 through 307-N. A set of service servers 308-1 through 308-X is also controllably connected to data communications network 306. Finally, a set of client stations 309-1 through 309-Y is also controllably connected to data communications network 306. It is noted that client stations 307 may each be a personal computer (PC), workstation or the like for accessing data communication network 306, i.e. the Internet. In this example, configurable QoS-enabled network elements 307 may include network routers and switches, network traffic shapers, application-level traffic redirectors, and application-level or network-level load balancers; the service servers 308 may include file servers (e.g. NFS), database servers, naming servers (e.g. DNS), network directories (e.g. LDAP), enterprise resource planning software, or servers rung any other networked application; and the clients 309 may include thin client terminals, personal digital assistants, telephony or video devices, or web browsers, applets, agents, on client programs running on personal computers or workstations.

Figure 4:
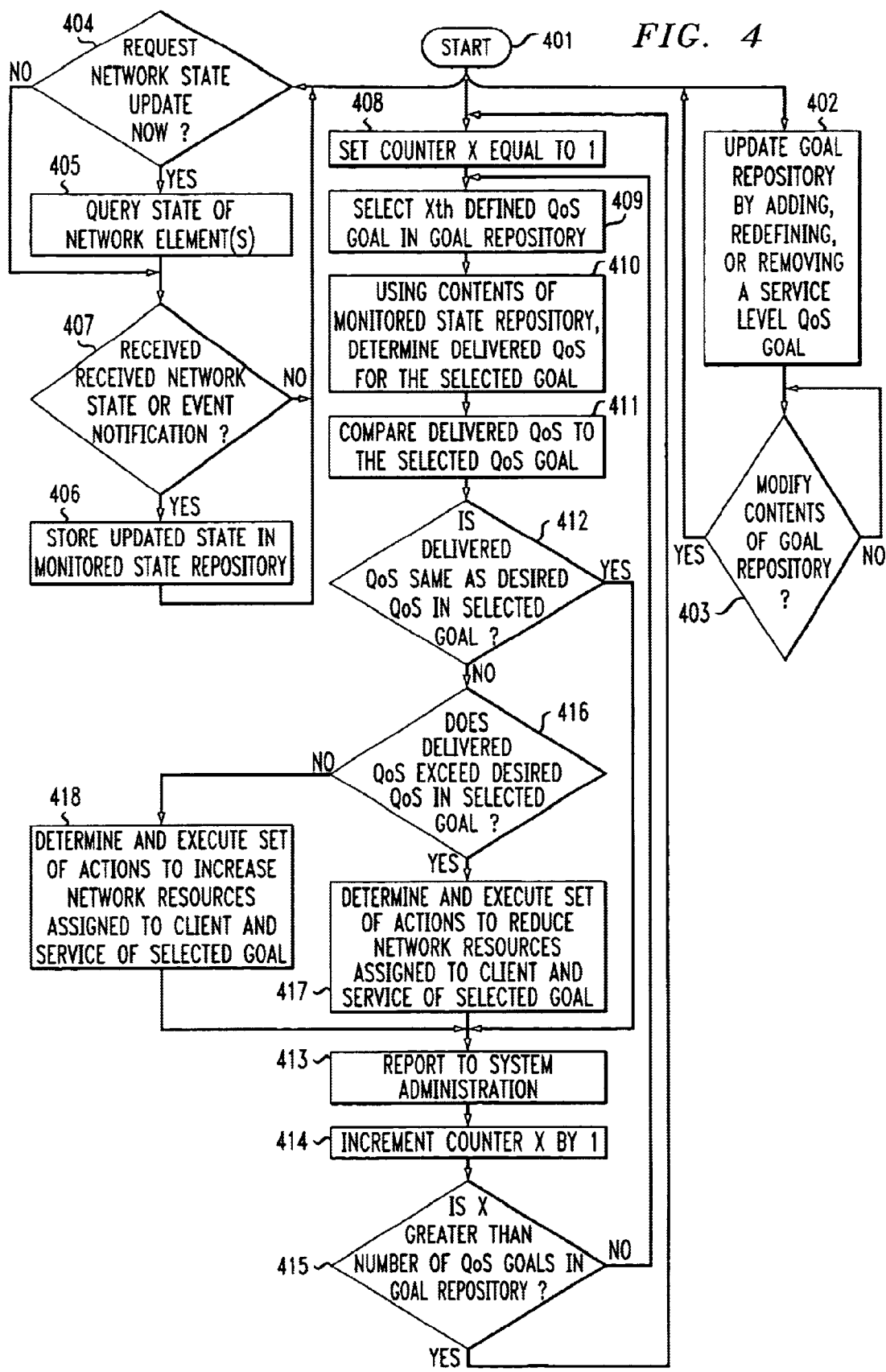
FIG. 4 is a flow chart illustrating steps in a process employed in an embodiment of the invention.

FIG. 4 is a flow chart illustrating steps in a process employed in an embodiment of the invention. The process is started in step 401. At run time, a system administrator or the like employing user interface 302 defines a service level QoS goal by selecting a client from 309-1 through 309-Y, an application from service servers 308-1 through 308-X, and a QoS expression. Stated another way, user interface 302 allows the system administrator to specify goal parameters for an objective "H" and choose when attempted enforcement of "H" should begin. At that time management server 301 parameterizes and instantiates P(G) for each goal G that is part of objective H, such that the policy logic of P is appropriate for enforcing goal G. For example, the policy logic described in simplified form in FIG. 2 could be selected to enforce a goal of the form given in FIG. 1. Thereafter, in this example, three processes run concurrently in management server 301. Specifically, a first sub-process includes maintaining the goal repository 304, a second sub-process maintains the monitored state repository 305 and a third sub-process effects the QoS management of defined goals. Again, these three sub-processes, once started, run concurrently and continuously.

The first sub-process of maintaining the goal repository 304 includes step 402 that causes the updating of goal repository 304 by adding, redefining or removing a service level QoS goal. Then, step 403 tests to determine whether the contents of goal repository 304 should be modified. If the test result in step 403 is YES, control is returned to step 402 that causes the updating of goal repository 304. If the test result in step 403 is NO, the test is iterated until a YES result is obtained and control is again returned to step 402. Steps 402 and 403 are continuously iterated, as described above.

The second sub-process of maintaining the monitored state repository 305 includes step 404 that tests to determine whether a network state update should be requested now. The network update is realized by monitoring elements employed in the network, including both clients and service servers. In one example, the monitoring is realized by obtaining measures of service performance statistics. The desired measurements are collected, in one example, by employing a so-called VitalAgent client-side monitoring software commercially available from Lucent Technologies Inc. See for example, http://www.ins.com/software/ for VitalAgent product documentation. If the test result in step 404 is YES, step 405 causes a query of the network element(s). Thereafter, step 407 tests to determine whether a network event notification has been received either for previously requested network state update or for an (unrequested) network update, i.e. an asynchronous or trap update. Such an event notification indicates that the state of the network has changed by the event that has occurred. If the test result in step 407 is YES, then step 406 causes the updated state to be stored in monitored state repository 305. Otherwise, if the test result in step 407 is NO, the control is returned to step 404. Returning to step 404, if the test result is NO, no update is requested and control is passed to step 407. Appropriate ones of steps 404 through 407 are iterated continuously.

The third sub-process of effecting the desired QoS management of defined goals includes step 408 that sets a counter X equal to one (1). Then step 409 causes the selection of the $X^{th}$ defined QoS goal in goal repository 304. Step 410 causes the use of the contents of monitored state repository 305 to determine the delivered QoS for the selected goal. In step 411, the delivered QoS is compared with the QoS expression of the selected QoS goal. Then, step 412 tests to determine if the delivered QoS is equal to the desired QoS for the selected QoS goal. If the test result in step 412 is YES, control is passed to step 413. Step 413 causes a report to be sent to the system administrator indicating that the delivered QoS satisfies the selected QoS goal. Then, step 414 causes counter X to be incremented by one (1), namely, X=X+1. Step 415 tests to determine if X in counter X is greater than the number of QoS goals in goal repository 304. If the test result in step 415 is YES, control is returned to step 408 and steps 408 through 415 are iterated until either step 412 or step 415 yields a NO result. If step 415 yields a NO result, control is returned to step 409 and steps 409 though 415 are iterated until step 412 yields a no result or step 415 yields a YES result. If step 412 yields a NO result, control is passed to step 416. Step 416 tests to determine whether the delivered QoS exceeds the selected QoS goal. If the test result in step 416 is YES, control is passed to step 417, Step 417 determines and executes a set of actions to reduce network resources, i.e. the resources of network elements such as buffer space or reserved bandwidth at a router, assigned to the client and service of the selected QoS goal. Thereafter, control is passed to step 413 that reports the set of actions taken in step 417, and the results of said actions, to the system administrator. Returning to step 416, is the test result is NO, control is passed to step 418. Step 418 determines and executes a set of actions to increase the amount of network resources assigned to the client and service of the selected QoS goal. Thereafter, control is passed to step 413 that reports the set of actions taken in step 417, and the results of said actions, to the system administrator. Then, control is passed to step 414 that increments counter X by one (1). Thereafter, step 415 is repeated as described above, and appropriate ones of steps 408 through 418 are iterated continuously. It is noted that the computations performed in the control flow, especially in steps 404, 410, 417 and 418, must vary depending upon the type of parameters included in the enforced goals and with the types of elements in the networked system wherein the QoS goals are enforced.

The above-described embodiments are, of course, merely illustrative of the principles of the invention. Indeed, numerous other methods or apparatus may be devised by those skilled in the art without departing from the spirit and scope of the invention.

What is claimed is:

1. A method for use in a policy goal-based management system employing service level goals for a computer network having one or more network resources comprising the steps of:

enabling a system administrator to specify predefined service level goals for said computer network;

specifying a prescribed quality of service goal for a prescribed client and prescribed service;

executing policy goal-logic to automatically enforce said specified quality of service goal, wherein said policy goal-logic is comprised in a general purpose computer program;

monitoring a delivered quality of service for said specified quality of service goal being executed by said policy goal-logic, said monitoring a delivered quality of service including continuously monitoring states of said computer network resources assigned to said prescribed client and said prescribed service;

determining if said delivered quality of service is different than said specified quality of service goal; and if so, said policy goal-logic executing prescribed actions regarding network resources assigned to said client for said prescribed service, wherein said actions are intended to adjust said delivered quality of service toward being equal to said specified quality of service goal, wherein said policy goal-action executes said prescribed actions without the system administrator having to specify said prescribed actions to said policy goal-logic intended to enforce said specified quality of service goal.

2. The method as defined in claim 1 wherein said step of determining if said delivered quality of service is different includes a step of determining if said delivered quality of service exceeds said specified quality of service goal and, if so, said step of executing includes steps of determining and executing a set of actions to reduce said computer network resources assigned to said prescribed client and said prescribed service of said specified quality of service goal.

3. The method as defined in claim 2 further including a step of reporting to said system administrator said set of actions.

4. The method as defined in claim 2 further including a step of reporting to said system administrator results of executing said actions.

5. The method as defined in claim 1 wherein said step of executing policy goal-logic to determine if said delivered quality of service is different includes a step of determining if said delivered quality of service is worse than said specified quality of service goal and, if so, said step of executing prescribed actions includes steps of determining and executing a set of actions to increase network resources assigned to said prescribed client and said prescribed service of said specified quality of service goal.

6. The method as defined in claim 5 further including a step of reporting to said system administrator said set of actions.

7. The method as defined in claim 6 further including a step of reporting to said system administrator results of executing said actions.

8. The method as defined in claim 1 further including the steps of storing said specified quality of service goals and determining whether said stored quality of service goals should be updated.

9. The method as defined in claim 8 further including a step of updating said stored quality of service goals.

10. The method as defined in claim 9 wherein each of said quality of service goals is a service level quality of service goal.

11. The method as defined in claim 10 wherein said step of updating includes steps of adding a service level quality of service goal to said stored quality of service goals, redefining a stored service level quality of service goal or removing a stored service level quality of service goal.

12. The method as defined in claim 1 further including steps of monitoring a state of each network resource in a set of network resources and storing said monitored states.

13. The method as defined in claim 12 further including a step of updating said monitored state of each network resource in said set of said network resources.

14. The method as defined in claim 13 wherein said step of updating includes steps of requesting an update of said state of each network resource in said set of network resources, querying said state of each network resource in said set of network resources and storing said updated state.

15. The method as defined in claim 12 wherein said step of monitoring said state of each network resource further includes steps of receiving a network event notification indicating a change in state of a network resource and storing said indicated change of state of said network resource as an update of the state of said network resource.

16. The method as defined in claim 1 further comprising the steps of:
   storing said set of service level quality of service goals;
   storing said monitored states of a set of network resources;
   wherein said step of specifying a prescribed quality of service goal includes selecting said prescribed defined quality of service goal from said stored service level quality of service goals for a prescribed client and prescribed service; and
   wherein said step of monitoring a delivered quality of service includes a step of using said stored monitored states to determine a delivered quality of service for said specified quality of service goal.

17. The method as defined in claim 16 wherein said step of determining if said delivered quality of service is different includes a step of determining if said delivered quality of service exceeds said specified quality of service goal and, if so, said step of executing includes steps of determining and executing a set of actions to reduce network resources assigned to said prescribed client and said prescribed service of said specified quality of service goal.

18. The method as defined in claim 17 further including a step of reporting to said system administrator said set of actions.

19. The method as defined in claim 18 further including a step of reporting to said system administrator results of executing said actions.

20. The method as defined in claim 16 wherein said step of determining if said delivered quality of service is different includes a step of determining if said delivered quality of service is worse than said specified quality of service goal and, if so, said step of executing includes steps of determining and executing a set of actions to increase network resources assigned to said prescribed client and said prescribed service of said specified quality of service goal.

21. The method as defined in claim 20 further including a step of reporting to said system administrator said set of actions.

22. The method as defined in claim 21 further including a step of reporting to said system administrator results of executing said actions.

23. Apparatus for use in a policy goal-based management system including service level goals for a computer network having one or more network resources comprising:
   means for enabling a system administrator to specify predefined service level goals for said computer network;
   means for specifying a prescribed quality of service goal for a prescribed client and prescribed service;
   means for executing policy goal-logic to automatically enforce said specified quality of service goal, wherein said policy goal-logic is comprised in a general purpose computer program;
   means for monitoring a delivered quality of service for said specified quality of service goal being executed by said policy goal-logic, including means for continuously monitoring states of said computer network resources assigned to said prescribe client and said prescribed service;
   means for determining if said delivered quality of service is different than said specified quality of service goal; and
   said means for executing said policy goal-logic, being responsive to said delivered is quality of service being different, to cause said police goal-logic to execute prescribed actions regarding network resources assigned to said client for said prescribed service, wherein said actions are intended to adjust said delivered quality of service toward being equal to said specified quality of service goal,
   wherein said police goal-action executes said prescribed actions without the system administrator having to specify said prescribed actions to said goal-logic intended to enforce said specified quality of service goal.

24. The apparatus as defined in claim 23 wherein said means for determining if said delivered quality of service is different includes means for determining if said delivered quality of service exceeds said specified quality of service goal and means for determining and executing a set of actions to reduce said computer network resources assigned to said prescribed client and said prescribed service of said specified quality of service goal.

25. The apparatus as defined in claim 24 further including means for reporting to said system administrator said set of actions.

26. The apparatus as defined in claim 24 further including means for reporting to said system administrator results of executing said actions.

27. The apparatus as defined in claim 23 wherein said means for determining if said delivered quality of service is different includes means for determining if said delivered quality of service is worse than said specified quality of service goal and means for determining and executing a set of actions to increase said computer network resources assigned to said client and said service of said specified quality of service goal.

28. The apparatus as defined in claim 27 further including means for reporting to said system administrator said set of actions.

29. The apparatus as defined in claim 27 further including means for reporting to said system administrator results of executing said actions.

30. The apparatus as defined in claim 23 further comprising:

means for storing said set of service level quality of service goals;

means for storing said monitored states of a set of said computer network resources;

wherein said means for specifying a prescribed quality of service goal includes means for specifying said prescribed defined quality of service goal from said stored service level quality of service goals for a prescribed client and prescribed service; and wherein said means for monitoring a delivered quality of service includes means for using said stored monitored states to determine a delivered quality of service for said specified quality of service goal.

31. The apparatus as defined in claim 30 wherein said means for determining if said delivered quality of service is different includes means for determining if said delivered quality of service exceeds said specified quality of service goal and means for determining and executing a set of actions to reduce network resources assigned to said prescribed client and said prescribed service of said specified quality of service goal.

32. The apparatus as defined in claim 31 further including a means for reporting to said system administrator said set of actions.

33. The apparatus as defined in claim 31 further including means for reporting to said system administrator results of executing said actions.

34. The apparatus as defined in claim 30 wherein said means for determining if said delivered quality of service is different includes means for determining if said delivered quality of service is worse than said specified quality of service goal and means for determining and executing a set of actions to increase network resources assigned to said prescribed client and said prescribed service of said specified quality of service goal.

35. The apparatus as defined in claim 34 further including means for reporting to said system administrator said set of actions.

36. The apparatus as defined in claim 34 further including means for reporting to said system administrator results of executing said actions.

* * * * *